United States Patent [19]
Töyrylä; Hannu

[11] Patent Number: 5,465,391
[45] Date of Patent: Nov. 7, 1995

[54] METHOD FOR SETTING UP A GROUP CALL IN A CELLULAR RADIO SYSTEM

[75] Inventor: Hannu Töyrylä, Vantaa, Finland

[73] Assignee: Nokia Telecommunications Oy, Espoo, Finland

[21] Appl. No.: 300,237

[22] Filed: Sep. 6, 1994

Related U.S. Application Data

[63] Continuation of Ser. No. 50,027, filed as PCT/FI92/00230, Apr. 26, 1992, abandoned.

[30] Foreign Application Priority Data

Aug. 29, 1991 [FI] Finland ................................. 914086

[51] Int. Cl.⁶ ..................................................... H04Q 7/38
[52] U.S. Cl. ........................ 455/33.4; 455/54.1; 455/56.1
[58] Field of Search ................................ 455/33.1, 33.4, 455/54.1, 56.1, 53.1, 49.1, 54.2, 32.1, 34.1, 34.2; 379/59, 60

[56] References Cited

U.S. PATENT DOCUMENTS 4,578,815  3/1986  Persinotti ................................. 455/33.4
4,682,367  7/1987  Childress et al. ..

FOREIGN PATENT DOCUMENTS 2659656  12/1977  Germany .
3130408   2/1983  Germany .
2173377  10/1986  United Kingdom .

Primary Examiner—Reinhard J. Eisenzopf
Assistant Examiner—Nguyen Vo
Attorney, Agent, or Firm—Cushman Darby & Cushman

[57] ABSTRACT

The invention relates to a method for setting up a group call in a cellular radio system. The method comprises allocating a traffic channel to the group call and transmitting a group call paging message containing a traffic channel indication via each base station (BS1) whose radio cell (C1) resides in a predetermined operation area of the called group to the mobile radio stations (MS1–MS5) of the group. In order to ensure that all the mobile stations of the group roaming in the area participate in the group call, an additional group call paging message is transmitted via the base stations (BS2) of radio cells (C2) adjacent to said predetermined operation area to mobile radios (MS4, MS5) of the group. The additional group call paging message contains an instruction to switch to the allocated traffic channel of the radio cell (C1) residing in said operation area.

2 Claims, 1 Drawing Sheet

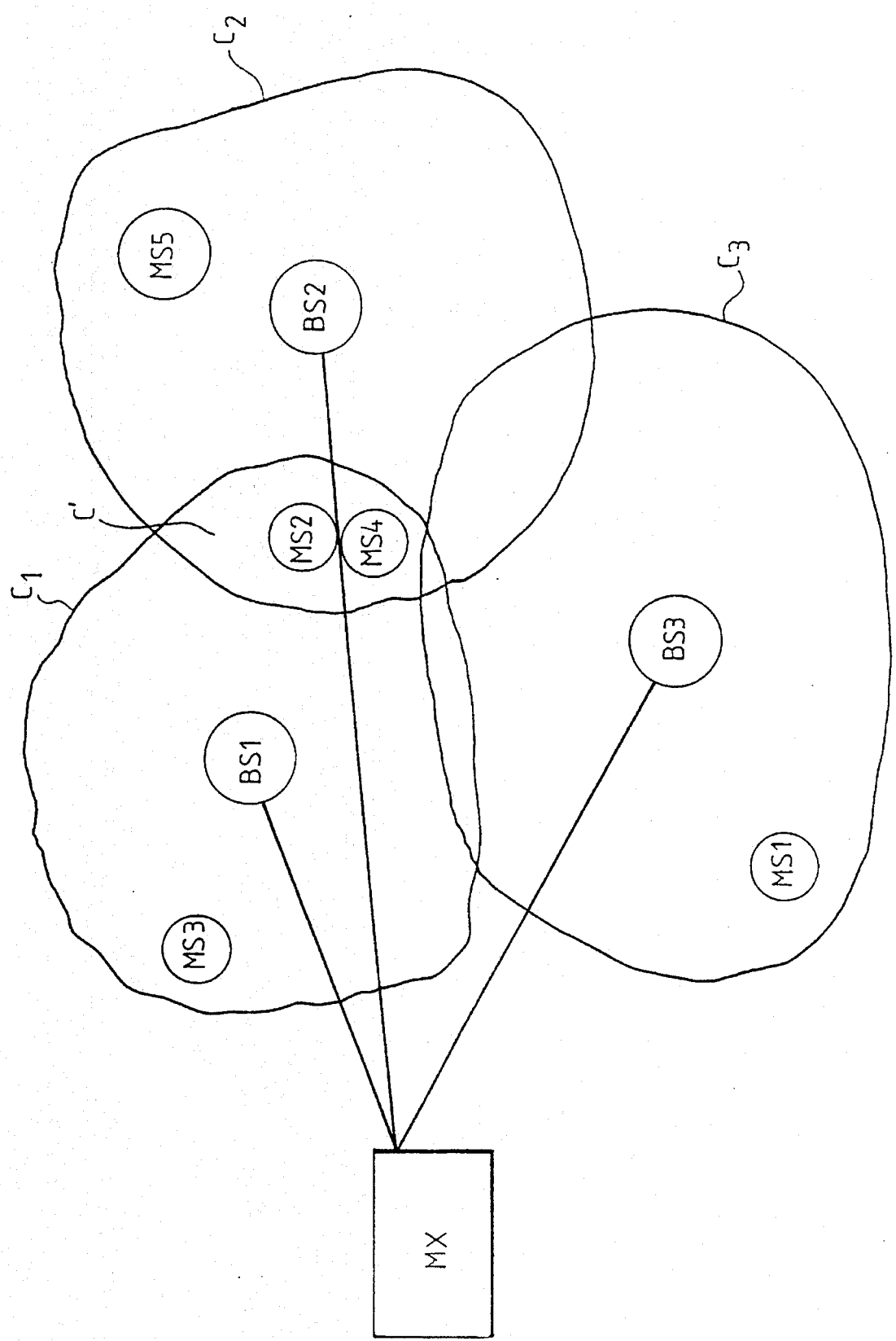

METHOD FOR SETTING UP A GROUP CALL IN A CELLULAR RADIO SYSTEM

This is a continuation of application Ser. No. 08/050,027, filed as PCT/FI92/00230, Apr. 26, 1992, which was abandoned upon the filing hereof.

FIELD OF THE INVENTION

The invention relates to a method for setting up a group call in a cellular radio system, the system comprising a plurality of radio cells with overlapping peripheral areas, each radio cell comprising a fixed radio station communicating by radio with mobile radio stations roaming in the system, the method comprising allocating a traffic channel to the group call and transmitting a group call paging message containing the traffic channel indication via each fixed radio station whose radio cell resides in a predetermined operation area of a called group to the mobile radio stations of the group.

BACKGROUND OF THE INVENTION

A group call is a conference call in which all participants may talk in turn and hear one another. In group calls, the whole group is called with a single dialled subscriber number, called a group number herein. An individual radio unit (e.g. mobile radio) may belong to a plurality of groups programmed into the radio unit. The system keeps a file on the base stations associated with the group number of each group. A group call may cover one, several or all base stations within the area of a mobile exchange or a plurality of mobile exchanges. In setting up a group call, a traffic channel is allocated from all base stations associated with the group, and each of these base stations transmits a group call paging message containing the group number and an indication of the allocated traffic channel. If the mobile radio identifies the group number contained in the group call paging message, it switches to the traffic channel indicated by the group call paging message. Therefore, it is always possible for a mobile radio station to join the group call if it is roaming in the predetermined operation area of the group.

In a mobile radio system operating on a cellular principle, adjacent base stations often have considerably overlapping coverage areas (radio cells). Mobile radios which are situated in a part of a coverage area shared by two base stations may use either one of the base stations. As regards a group call, the situation is problematic if one base station is located within the predetermined operation area of a given group and the other outside it. If a group call is set up in the overlapping area of such coverage areas, mobile radios of the same group may utilize different base stations, whereby only some of them join the group call, although in principle all are in the operation area reserved for the group.

Attempts have been made to solve this problem by setting up the group call, just in case, through more base stations than actually required for covering the operation area of the group. Traffic channels for the group call are also allocated from such 'extra' base stations. This solution, however, leads to inefficient use of traffic channels in the system and may even be impossible in some systems for lack of traffic channels.

The object of the invention is a method for setting up regional group calls without the abovementioned disadvantages.

SUMMARY OF THE INVENTION

This is achieved with a method such as disclosed in the introductory paragraph. According to the invention, this method is characterised by transmitting an additional group call paging message via fixed radio stations of radio cells adjacent to the predetermined operation area to the mobile radios of the group, said additional group call paging message containing an instruction to switch to the traffic channel of the radio cell residing in the operation area, which traffic channel is allocated to the specific group call.

The idea of the invention is to allocate traffic channels to a group call only at those fixed radio stations whose coverage area is sufficient to cover the operation area of the group concerned, whereas at fixed radio stations of the radio cells abutting on the operation area a group call paging message is transmitted containing an instruction to switch to one of the traffic channels allocated in the operation area. This is a sure way of reaching also such members of the group that are in the peripheral zones of the operation area and that are in radio connection with a fixed radio station outside the operation area. In addition, the method utilises the traffic channels of the system efficiently.

BRIEF DESCRIPTION OF THE DRAWING

In the following the invention is described in more detail by means of an embodiment with reference to the attached FIGURE, which illustrates a radio system in which the invention may be applied.

DETAILED DESCRIPTION OF THE INVENTION

The FIGURE shows a mobile radio system in which the geographical area covered by the system is divided into smaller radio areas or radio cells C1, C2 and C3 so that adjacent cells have preferably overlapping peripheral areas. Specific radio frequency channels have been assigned to each cell for speech connections so that at least neighbouring cells have different frequencies. Each cell C1, C2 and C3 has at least one fixed multichannel transceiver equipment BS1, BS2 and BS3, called a base station herein. All the base stations BS1, BS2 and BS3 are coupled to a mobile exchange MX, which controls the operation thereof.

For control signalling, such as call set-up signalling, in the system, either each base station has an individual radio frequency channel as a control channel, or a plurality of base stations BS1, BS2 or BS3 have a common radio frequency channel as a control channel. The common control channel is used by the base stations BS1, BS2 or BS3 sequentially on a time-shared basis for transmitting their control messages. In the latter case the system may comprise a plurality of base station groups, each having their own control channel. The transmission sequence starts from a given base station and terminates in a pause before the sequence starts again with a transmission from the same base station. In the preferred embodiment of the invention, control signals or bursts transmitted on the control channel comply with mobile radio signalling according to the MPT standard 1327 issued by the British Department of Trade and Industry (DTI). Thus each burst is preceded by a pause during which none of the base stations BS transmits on the control channel. Each burst contains a frame which begins with the fields LET, PREAMBLE and SYNC, as specified in the MPT standard 1327, chapter 3.3.3.1. Each burst is also marked with the identifier of the transmitting base station.

One or more mobile transceivers, i.e. mobile radios MS1–MS5 roam freely within the area of the mobile radio system. Each mobile radio MS must be registered with one of the base stations when roaming within the system. In this way the system keeps a register on the rough location of the mobile radios MS for call set-up procedures. The mobile radios MS are allowed to roam freely from one cell C to another but they have to register with the base station BS of the new cell C on transition. The mobile radio MS is considered to be active in the cell C when the telephone has selected the cell in accordance with a predetermined procedure, the base station BS of the cell has transmitted a burst and the mobile radio MS has received the identifier of the base station. The selecting procedure can be based on the strength of the signal received from the different base stations BS and on the quality of signalling in view of the mobile radio MS. Such registering is not, nevertheless, an indispensable feature for the invention.

Normally the system sets up a call between the mobile radio MS and another mobile radio or a subscriber of a public switched telephone network PSTN. A call to a given mobile radio is set up by dialling the subscriber number of the mobile radio. In group calls the whole group is called with a single dialled number, i.e. a group number. A group call is a conference call in which all participants may talk in turn and hear one another. An individual mobile radio may belong to a plurality of groups programmed into the mobile radio. The system keeps a file on the base stations associated with the group number of each group. A group call may cover one, several or all base stations within the area of a mobile exchange or a plurality of mobile exchanges.

When the user wishes to make a group call, the mobile radio transmits a signalling message indicating at least that the request concerns a group call and the group number of the desired group. In general, the message contains the subscriber number of the subscriber as well.

In general, it is the mobile exchange MX to which the base stations BS are coupled that reacts to the signalling message. On the basis of the group number the exchange MS retrieves from its register information on which base stations BS belong to the operation area of the group call concerned. The exchange MX allocates the traffic channels from said base stations, queuing for a channel if a free channel is not immediately available.

When the channel is allocated at a given base station BS, the exchange MX transmits, on the control channel of this base station, to the mobile radios of the group an instruction to switch to the call on the allocated channel. If the mobile radio identifies the group number contained in the group call paging message, it switches to the traffic channel indicated by the group call paging message. In principle it is thus possible for a mobile radio to join a group call if it is located within the predetermined operation area of the group.

In a mobile radio system operating on a cellular principle, adjacent base stations BS often have considerably overlapping coverage areas (radio cells), such as do radio cells C1 and C2 in the drawing FIGURE. Mobile radios MS2 and MS4 roaming in the overlapping area C' of the coverage areas C1 and C2 of two base stations BS1 and BS2 may use either one of the base stations BS1 and BS2. As regards a group call, the situation is problematic if one base station BS1 is located within the predetermined operation area of a given group and the other base station BS2 outside it.

Let us assume that a group call is set up in the overlapping area C' of the coverage areas C1 and C2, and the mobile radio MS2 uses the base station BS1 and MS4 the base station BS2. If the group call paging message is transmitted through the base station BS1, only MS2 receives the group call paging message through the base station BS1 and joins the group call, although in principle both mobile phones are situated in the operation area allocated to the group, i.e. area C'.

The invention resolves this problem in such a manner that a group call paging message is transmitted from the base stations BS of radio cells abutting on the predetermined operation area of a group having a given group call number. This group call paging message contains the group call number and an instruction to switch to the traffic channel of a radio cell in the operation area which is allocated to the group call in question. At these 'outside' base stations no traffic channel is allocated to the group call.

The method can be illustrated by means of an example pertaining to the FIGURE. Let us further assume that the base station BS1 resides within the predetermined operation area of a given group and the other base station BS2 outside it. It is still further assumed that a group call is set up in the overlapping area C' of the coverage areas C1 and C2, and the mobile radio MS2 utilises the base station BS1, and MS4 the base station BS2. In accordance with the invention, the base station BS1 allocates a traffic channel to the group call and transmits a group call paging message containing the group call number and an indication of the allocated traffic channel. MS2 receives the group call paging message transmitted by BS1 and joins the group call by switching to the traffic channel in question. The base station BS2 does not allocate a traffic channel but transmits a group call paging message containing a group call number and an instruction to switch to the traffic channel allocated by BS1. MS4 receives the group call paging message transmitted by BS2 and joins the group call by switching to the traffic channel of BS1. The invention thus ensures that all mobile phones just barely within the range of audibility of BS1 are included regardless of whether they are initially in contact with BS1 or BS2.

The only disadvantage in the method of the invention is that the mobile radios of the group beyond the range of audibility of BS1 (the coverage area of the group call), such as MS5, may receive the group call paging message transmitted by BS2 instructing to switch to the traffic channel of BS2. A group call is not, however, usually possible for these mobile radios. Depending on the operation of the mobile radios, a weak connection is established, or a connection on which nothing can be heard (or mere noise), or the mobile radio releases the connection automatically on detecting that the requirements for a connection are not satisfied. All the above-mentioned mobile radios may be used in connection with the invention but the last mentioned is most preferred. The user receives an indication that a group call has been attempted but he himself is outside the coverage area.

Applying the invention requires only a few modifications to the existing procedures. In the preferred embodiment of the invention the method is realised without any modifications to the mobile radios. This has been possible, because the signalling messages between the mobile exchange and the mobile radio already contain the information required for the method.

The operation area of each group call is defined with regard to the mobile exchange MX in such a manner that for each base station there is a list of the adjacent base stations through which a group call paging message is also to be transmitted. Alternatively, these 'adjacent' base stations may be listed for each group. In group call set-up, the mobile exchange MX retrieves the 'adjacent' base stations thus defined from its register and transmits a group call paging message on the signalling channels of these as well.

Although the embodiment given by way of example is based on the centralised control of the mobile exchange MX, the invention may also be applied in a decentralised environment, e.g. in a case where the base stations are located within the area of a plurality of exchanges. The method may also be applied without the exchange MX, in which case the realisation is based on the intelligence and mutual co-operation of the base stations.

The FIGURE and the associated description are merely intended to illustrate the present invention. In its details the radio system according to the invention may vary within the scope of the attached claim.

I claim:

1. A method for setting up a group call potentially involving a plurality of mobile radio stations, in a mobile radio system in which a geographical area covered by the system is divided into a plurality of radio cells, at least some of which overlap one another in at least one respective overlapping peripheral area, each cell having at least one base station provided with a respective multichannel transceiver, each base station being assigned at least one radio frequency channel for speech connections, the radio frequency channels for speech connections being different from one another in neighboring ones of said cells, each said base station also having a radio frequency channel for control, there being at least two mobile radio stations within said geographical area, each registered with a respective base station of a respective cell, but being free to roam within said geographical area providing that when transitioning beyond a respective said overlapping area from one said cell to another said cell, the respective mobile radio station changes registration from the respective cell departed to the respective cell entered, comprising:

a) programming into each of said mobile radio stations an identification of at least one group to which each mobile radio station belongs;

b) maintaining a file listing which of the base stations in said plurality of radio cells belong to an operation area of the group, said operation area being smaller than said geographical area covered by said mobile radio system, c) initiating a group call, initiating a signalling message by a user's respective said mobile radio station indicating that a group call is requested and the identity of the desired said group, d) retrieving from said file information as to which of said base stations serve cells belonging to said operation area of the respective said group, and allocating traffic channels for said group call on each of the respective base station multichannel transceivers belonging to said operation area, e) transmitting on a control channel of said multichannel transceivers of said base stations which belong to said operation area of the respective said group, to the mobile radio stations of the respective said group, a first group call paging message containing an instruction to switch to said group call on the respective said allocated traffic channel of a respective one of said base stations belonging to said operation area of the respective said group call, f) receiving said first group call paging message at said mobile radio stations registered to any of said base stations belonging to said operation area of the respective said group, and switching said mobile radio stations belonging to said operation area of the respective said group to said group call on the respective said allocated traffic channel of a respective one of said base stations belonging to said operation area of the respective said group call, g) determining which of said base stations in said plurality of radio cells are in radio cells not belonging to but abutting radio cells belonging to said operation area of the respective said group, h) transmitting on a control channel of said multichannel transceivers of said base stations in said abutting cells, to the mobile radio stations of the respective said group, a second group call paging message which contains the respective said group identification and an instruction to mobile radio stations receiving said second group call paging message and belonging to the respective said group, to switch to a respective said allocated traffic channel of a respective adjoining one of said base stations belonging to said operation area of the respective said group call, i) receiving said second group call paging message at said mobile radio stations which are registered to any of said base stations in said abutting radio cells and belonging to the respective said group, and switching said mobile radio stations to said group call on the respective said allocated traffic channel of a respective adjoining one of said base stations belonging to said operation area of the respective said group call.

2. A method for setting up a group call potentially involving a plurality of mobile radio stations, in a mobile radio system in which a geographical area covered by the system is divided into a plurality of radio cells, at least some of which overlap one another in at least one respective overlapping peripheral area, each cell having at least one base station provided with a respective multichannel transceiver, each base station being assigned at least one radio frequency channel for speech connections, the radio frequency channels for speech connections being different from one another in neighboring ones of said cells, each said base station also having a radio frequency channel for control, there being at least two mobile radio stations within said geographical area, each registered with a respective base station of a respective cell, but being free to roam within said geographical area providing that when transitioning beyond a respective said overlapping area from one said cell to another said cell, the respective mobile radio station changing registration from the respective cell departed to the respective cell entered, comprising:

a) programming into each of said mobile radio stations an identification of at least one group to which each mobile radio station belongs;

b) maintaining a first file listing which of the base stations in said plurality of radio cells belong to an operation area of the group, said operation area being smaller than said geographical area covered by said mobile radio system, c) maintaining a second file listing which of said base stations in said plurality of radio cells are in radio cells not belonging to but abutting base stations belonging to said operation area of the respective said group, d) initiating a group call, initiating a signalling message by a user's respective said mobile radio station indicating that a group call is requested and the identity of the desired said group, e) retrieving from said first file information as to which of said base stations serve cells belonging to said operation area of the respective said group, and allocating traffic channels for said group call on each of the respective base station multichannel transceivers belonging to said operation area, f) transmitting on a control channel of said multichannel transceivers of said base stations which belong to said operation area of the respective said group, to the mobile radio stations of the respective said group, a first group call paging message containing an instruction to switch to said group call on the respective said allocated traffic channel of a respective one of said base stations belonging to said operation area of the respective said group call, g) receiving said first group call paging message at said mobile radio stations which are registered to any of said base stations belonging to said operation area of the respective said group, and switching said mobile radio stations to said group call on the respective said allocated traffic channel of a respective one of said base stations belonging to said operation area of the respective said group call, h) retrieving from said second file information listing which of said base stations in said plurality of radio cells are in radio cells not belonging to, but abutting base stations belonging to said operation area of the respective said group, i) transmitting on a control channel of said multichannel transceivers of said base stations in said abutting cells, to mobile radio stations of the respective said group, a second group call paging message which contains the respective said group identification and an instruction to mobile radio stations receiving said second group call paging message and belonging to the respective said group, to switch to a respective said allocated traffic channel of a respective adjoining one of said base stations belonging to said operation area of the respective said group call, j) receiving said second group call paging message at mobile radio stations registered to any of said base stations in said abutting radio cells and belonging to the respective said group, and switching said mobile radio stations to said group call on the respective said allocated traffic channel of a respective adjoining one of said base stations belonging to said operation area of the respective said group call.

* * * * *

UNITED STATES PATENT AND TRADEMARK OFFICE
CERTIFICATE OF CORRECTION

PATENT NO.    : 5,465,391

DATED         : November 7, 1995

INVENTOR(S)   : TÖYRYLÄ, Hannu

It is certified that error appears in the above-identified patent and that said Letters Patent is hereby corrected as shown below:

On the title page:

Inventor's name at top heading, delete "; Hannu".

Item [63], change "Apr." to --Aug.--.

Signed and Sealed this

Fourteenth Day of May, 1996

Attest:

BRUCE LEHMAN

Attesting Officer        Commissioner of Patents and Trademarks